US009664553B1

(12) United States Patent
Smith

(10) Patent No.: US 9,664,553 B1
(45) Date of Patent: May 30, 2017

(54) FLOAT-BASED SENSOR SYSTEM AND METHOD FOR MEASURING FLUID LEVEL

(71) Applicant: Andrew L. Smith, Fort Myers, FL (US)

(72) Inventor: Andrew L. Smith, Fort Myers, FL (US)

( * ) Notice: Subject to any disclaimer, the term of this patent is extended or adjusted under 35 U.S.C. 154(b) by 545 days.

(21) Appl. No.: 13/924,190

(22) Filed: Jun. 21, 2013

Related U.S. Application Data

(60) Provisional application No. 61/662,773, filed on Jun. 21, 2012.

(51) Int. Cl.
*G01F 23/30* (2006.01)

(52) U.S. Cl.
CPC .................... *G01F 23/30* (2013.01)

(58) Field of Classification Search
None
See application file for complete search history.

(56) References Cited

U.S. PATENT DOCUMENTS

| | | | | |
|---|---|---|---|---|
| 3,693,445 A | * | 9/1972 | Johnson | G01F 23/2962 367/908 |
| 5,054,319 A | * | 10/1991 | Fling | G01F 23/72 250/577 |
| 5,743,135 A | * | 4/1998 | Sayka | G01F 23/2927 250/577 |

* cited by examiner

*Primary Examiner* — Paul West
*Assistant Examiner* — Mark A Shabman
(74) *Attorney, Agent, or Firm* — Aldo Noto; Davidson Berquist Jackson & Gowdey LLP

(57) ABSTRACT

Embodiments of a system and method for providing a float-based sensor are disclosed. Embodiments of the system and method provide a sealed pipe or tube, also referred to as a barrier chamber, that is located inside a tank (or body of water) to measure a fluid level in the tank, such as a fuel tank, an oil tank, a chemical tank, a water tank, and the like. No fluid is able to penetrate the interior of the sealed pipe to avoid any electrical, mechanical, or chemical problems, or degradation. Embodiments of the system and method use a float having a magnet that magnetically couples to a target located within the barrier chamber's interior. The movement of the target is constrained to one dimension, allowing it to move up and down as the fluid level in the tank (or body of water) moves the magnetically coupled float up and down.

29 Claims, 4 Drawing Sheets

FLOAT-BASED SENSOR SYSTEM AND METHOD FOR MEASURING FLUID LEVEL

CROSS REFERENCE TO RELATED APPLICATIONS

This application claims priority from U.S. Provisional Patent Appl. No. 61/662,773, filed on Jun. 21, 2012, which is hereby incorporated herein by reference in its entirety.

FIELD OF THE INVENTION

The technical field is fluid level measurement sensor systems and methods.

BACKGROUND OF THE INVENTION

Current electronic fluid level sensing technology generally includes two types: discrete level and analog level. Discrete level type sensors return one or several electrical signals indicating when a monitored fluid reaches one or several predetermined levels. The analog level type sensors return a single electrical signal that correlates to the fluid level within a range of fluid levels. The analog signal may be a current or a voltage that varies with fluid level.

Generally, analog fluid sensors are more complicated and expensive than discrete level sensors because of the electronics necessary. Some common electronic technologies for analog fluid sensors include capacitive sensors to measure the electric field flux variations imposed by proximal fluid, and ultrasonic sensors that measure sonic echo delays varied by fluid surface distances. Discrete level sensing technology often uses a float and a switch or a float with a magnet and one or more small magnetic switches along the path of the float. "Level sensor" on Wikipedia offers an in-depth discussion of current fluid level sensor types and how they work. For example, level sensors detect the level of substances that flow, including liquids, slurries, granular materials, and powders. Fluids and fluidized solids flow to become essentially level in their containers (or other physical boundaries) because of gravity whereas most bulk solids pile at an angle of repose to a peak. The substance to be measured can be inside a container or can be in its natural form (e.g., a river or a lake). The level measurement can be either continuous or point values. Continuous level sensors measure levels within a specified range and determine the exact amount of substance in a certain place, while point-level sensors only indicate whether the substance is above or below the sensing point. Generally the latter detect levels that are excessively high or low.

The electronics are usually chemically and electrically isolated from the fluid whose level is to be measured. Sometimes, greater accuracy imposes higher demands on the isolation and mechanics, which can also lead to higher costs and more complex solutions.

SUMMARY OF THE INVENTION

A system and method that measures a fluid level using a float that floats at or near the top surface of a fluid is described. When the fluid raises or lowers, the float will follow and will be similarly raised or lowered, respectively. The system includes a float, a target, and a sensor. The system ascertains the fluid level using the sensor to determine the location of a target coupled to the float. The target is magnetically coupled to the float so that when the float raises or lowers with the height of the fluid, the target also raises or lowers, respectively. A sensor is provided to sense the location of the target. The sensor is capable of detecting energy reflected from the target so that the amount of energy ultimately corresponds to the height of the fluid. The target and sensor may be deployed within a sealed, pipe-like barrier chamber to protect each from the fluid and degradation.

More specifically, a system for providing a float-based sensor to measure a fluid level is disclosed. The system comprises a barrier chamber having an interior portion. The barrier chamber comprises: a barrier that defines the interior portion; a sensor; one or more energy sources; and a target located within the interior portion and capable of movement within the interior portion. The system also comprises one or more floats located exteriorly to the barrier and having one or more magnets, wherein the one or more floats are magnetically coupled to the target via the one or more magnets, and wherein the sensor determines a location of the target by measuring an amount of energy detected by the sensor. The interior portion may be sealed via the barrier. The target may be spherical in shape and may be a reflective or photo-absorbing optical target. The target is preferably capable of movement only in one dimension within the interior portion. At least one signal conductor may be connected to the sensor and electronically delivers, amplifies, and/or converts variations in the amount of energy detected by the sensor. The at least one signal conductor may be connected to the sensor via electronic circuitry contained within the interior portion. An interior surface of the barrier may have reflective properties which contrast with reflective properties of the target.

In one embodiment, the sensor is an optical sensor and each of the one or more energy sources is a light source. In another embodiment, the sensor is an audio sensor and each of the one or more energy sources is an audio source. In yet another embodiment, the sensor is a radio frequency (RF) sensor and each of the one or more energy sources is an RF source.

In a further embodiment, the barrier chamber, one or more floats, and a fluid level to be measured are contained within a tank.

A method is also described for providing a float-based sensor to measure a fluid level. The method comprises: providing a barrier chamber comprising a barrier defining an interior portion; providing a sensor; providing one or more energy sources; providing a target within the interior portion and capable of being moved within the interior portion; and providing one or more floats located exteriorly to the barrier and having one or more magnets. The one or more floats are magnetically coupled to the target via the one or more magnets. The sensor determines a location of the target by measuring an amount of energy detected by the sensor. The interior portion may be sealed via the barrier. The target may be spherical in shape and may be a reflective or photo-absorbing optical target. The target is preferably capable of moving only in one dimension within the interior portion. The method may also comprise connecting at least one signal conductor to the sensor, wherein the at least one signal conductor electronically delivers, amplifies, and/or converts variations in the amount of energy detected by the sensor. The method may further comprise providing electronic circuitry within the interior portion to connect the at least one signal conductor to the sensor. An interior surface of the barrier may have reflective properties which contrast with reflective properties of the target.

In one embodiment, the sensor is an optical sensor and each of the one or more energy sources is a light source. In another embodiment, the sensor is an audio sensor and each of the one or more energy sources is an audio source. In yet another embodiment, the sensor is a radio frequency (RF) sensor and each of the one or more energy sources is an RF source.

In a further embodiment, the method further comprises providing a tank containing the barrier chamber, one or more floats, and a fluid level to be measured.

A system for providing a float-based sensor to measure a fluid level using a guide is also disclosed. The system comprises a sensor and an energy source. The system also comprises a guide element and a target capable of floating on a fluid while being guided by the guide element and reflecting energy from the energy source. The sensor determines a location of the target by measuring an amount of energy originating from the energy source, reflected by the target, and detected by the sensor. The sensor is preferably of a type selected from the group consisting of an optical sensor, an audio sensor, a radio frequency (RF) sensor, an electromagnetic sensor, and combinations thereof. The target is preferably capable of movement only in one dimension.

In one embodiment, the sensor and energy source are located below the target. The system may further comprise an enclosure, wherein the sensor and energy source are contained within the enclosure such that the sensor and energy source are spaced from a fluid corresponding to the fluid level.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

Figure 1:
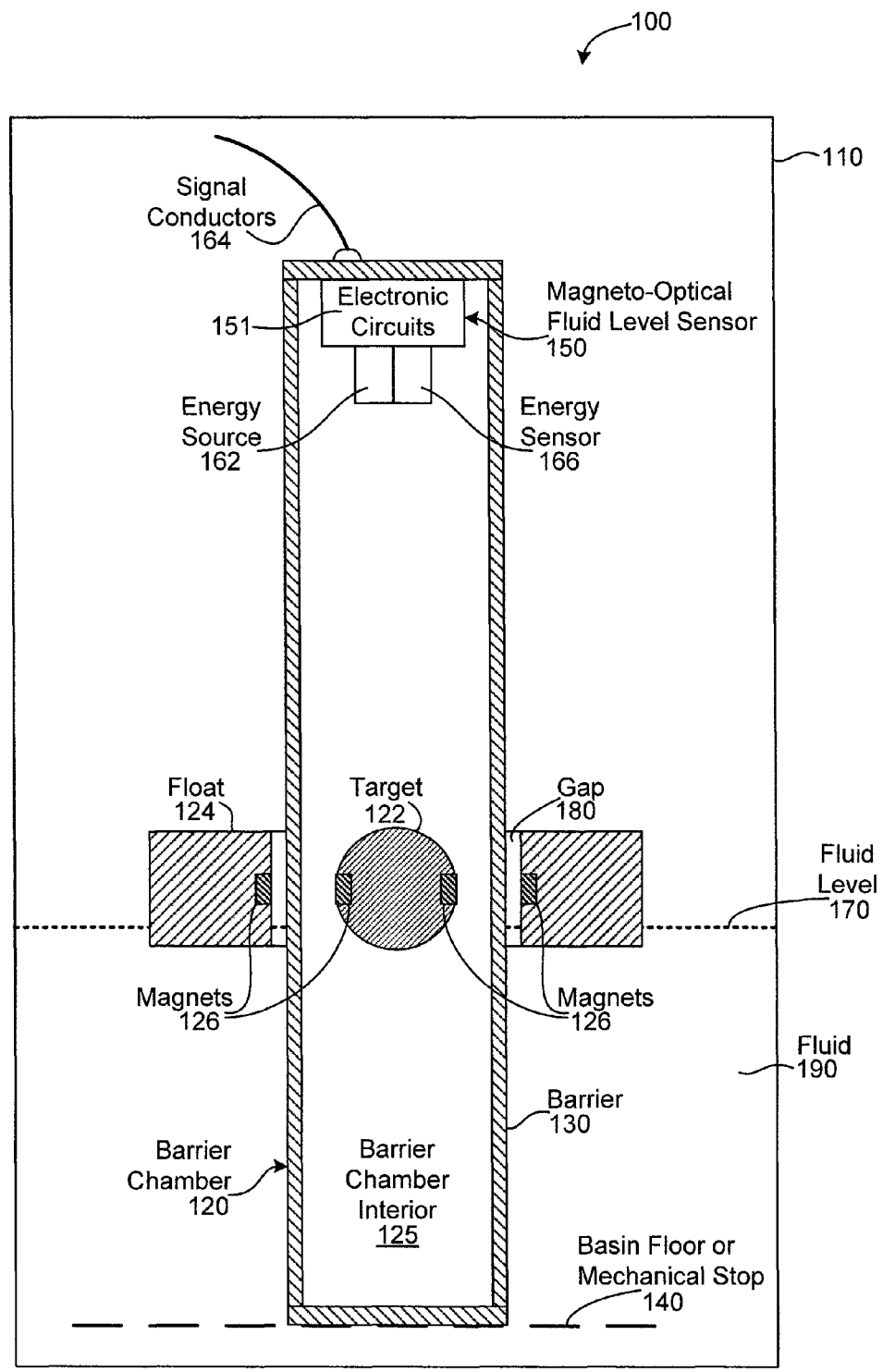
FIG. 1 is a cross-sectional side view illustrating an embodiment of a system for providing a magneto-optical float-based sensor.

It is to be understood that the figures and descriptions of the present invention may have been simplified to illustrate elements that are relevant for a clear understanding of the present invention, while eliminating, for purposes of clarity, other elements found in a typical fluid measurement system or typical fluid measurement method. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

For purposes of this disclosure, the term "fluid" comprises substance(s) that is/are capable of flowing, including liquids, slurries, granular materials, powders, and other fluidized solids.

As noted above, current electronic fluid level sensing technology generally includes two types: discrete level and analog level. Discrete level type sensors return one or several electrical signals indicating when a monitored fluid reaches one or several predetermined levels. The analog level type sensors return a single electrical signal that correlates to the fluid level within a range of fluid levels. The analog signal may be a current or a voltage that varies with fluid level.

Generally, analog fluid sensors are more complicated and expensive than discrete level sensors because of the electronics necessary. Some common electronic technologies for analog fluid sensors include capacitive sensors to measure the electric field flux variations imposed by proximal fluid, and ultrasonic sensors that measure sonic echo delays varied by fluid surface distances. Discrete level sensing technology often uses a float and a switch or a float with a magnet and one or more small magnetic switches along the path of the float.

In all of these cases, the electronics are usually chemically and electrically isolated by a barrier from the fluid whose level is to be measured.

Embodiments of a system and method for providing a low-cost float-based sensor are disclosed. Embodiments of a system and method provide a sealed pipe or tube, or other barrier chamber. The barrier chamber is often located inside a tank or other type of container to measure a fluid level or level of a material in the tank. The fluid level or material level in any container or tank may be measured, for example, a tank containing fuel, oil, a chemical, water, beer, wine and the like. In most embodiments, a portion of the system is closed and no fluid goes inside the barrier chamber or sealed pipe to avoid any electrical, mechanical, or chemical problems, or degradation. Embodiments of the system and method offer a wide range of analog and/or digital output and good accuracy. The embodiments may be applied in many varied industries. Some embodiments use magnets and optical sensors.

FIG. 1 illustrates an embodiment of a system 100 for providing a float-based level indicator using a magneto-optical (or magneto-optic) float-based level sensor 150. Generally, the system 100 comprises a float-based target 122 and a level sensor 150 or other means for measuring the location of the target 122 which is indicative of the level/height of the fluid to be measured. An embodiment of the system 100 provides a barrier chamber 120 inside a tank 110. The barrier chamber 120 may alternatively be referred to as barrier tube, barrier pipe, tube, or pipe and may be cylindrical in height or another shape such as conical. The horizontal cross-section of the barrier chamber 120 (i.e., in a direction parallel to the fluid top surface) may be circular, square, or any other shape. The barrier chamber 120 may be of various shapes and sizes. In some embodiments, the chamber 120 may be a sealed system. The barrier chamber 120 includes a barrier chamber interior 125 which is separated from the fluid 190 in the tank 110 by a barrier 130, also referred to as sidewalls. The float-based level sensor 150, which includes electronic circuits 151, may be attached to one or more energy (e.g., light) sources 162, energy (e.g., light) sensors 166, and signal conductors 164 connected to the electronic circuits 151. In an embodiment, the level sensor 150 is an optical type sensor which would utilize light-type energy source 162 and light-type energy sensor 166.

The system 100 uses a float 124 with at least one magnet 126. The magnet(s) 126 may be attached, strapped, or embedded into the float 124, or otherwise operably connected to the float 124. The float 124 is magnetically coupled to an optical target 122 that is preferably reflective or photo-absorbing. In one embodiment, the float 124 is separated from the barrier chamber interior 125 via the barrier 130. A gap 180 may be provided between the float 124 and barrier 130. One skilled in the art will appreciate that other types of targets may equally be used as long as the target 122 is magnetically coupled to the float 124. The barrier may have reflective properties which preferably contrast with the target 122. In an embodiment, the movement of the target 122 is generally constrained to one direction, allowing it to move up and down as the fluid level 170 in the tank 110 moves the magnetically coupled float 124 up and down within the barrier chamber interior 125.

Embodiments of the system and method for providing a float-based sensor may use a number of methods to correlate the position of the target 122 to an analog signal output, such as via signal conductors 164 shown in FIG. 1 which illustrates a simple and inexpensive method is to optically correlate the position of the target to an analog signal output.

In an embodiment, the float 124 is a toroidal float with a sufficient magnetic field generated by one or more embedded magnets 126. The float 124 in this embodiment is axially wrapped around non-magnetic barrier 130. In this embodiment, the wrap-around float is generally donut in overall shape. However, those of ordinary skill in the art will realize that other overall shapes and configurations such as triangular, square, horseshoe or crescent-shaped may be used for the float 124. The float 124 may have a square or rectangular cross-section as shown in FIG. 1, although other cross-sectional shapes such as circular, oval, triangular, pentagonal, or hexagonal may be alternatively utilized. As a result of the configuration in this embodiment, the float 124 is magnetically coupled to a preferably light-weight, light-absorbing target 122 in the shape of, for example, a sphere. The target 122 can be of various shapes such as disk, elliptical, cylindrical, or cube. The target 122 is able to slide up and down in a generally vertical direction within the barrier chamber interior 125, generally uninhibited.

One or more floats 124 may be used and need not necessarily axially surround the barrier 130. In embodiments with a plurality of floats 124, the floats may be connected or tied together in some manner. In addition to taking on different shapes, the floats 124 may be connected, embedded by, or attached to one or more magnets in numerous locations including via connection/attachment/embedded to the top, bottom, sides, or edges of the float 124. The float 124 or floats (not shown) may be encased or surrounded by an enclosure (i.e., separate from the barrier 130) such as a single pipe or one pipe or an encasing for each float 124. In alternative embodiments, various coatings are used on the exterior of the float(s) to protect the float(s) from the fluid and degradation. Limiters or stops 140 may be used to prevent the floats 124 from rising too high or too low vertically with reference to the barrier 130, and may be used to support the overall barrier chamber 120.

In one embodiment, a light source 162 and a light sensor 166 are part of the level sensor 150. The level sensor 150 may be present within one end of the barrier chamber 120, with source 162 and sensor 166 preferably generally pointing toward the target 122. The reflective properties between sidewalls 130 of the barrier chamber 120 and the target 122 may differ enough so that the amount of light striking the sensor 166 as the target 122 moves up and down within the barrier chamber interior 125 may vary, i.e. in an amount sufficient enough to be measured. This variation may be easily delivered electronically by wire, amplified, or converted to any of a number of signal forms, including 4-20 mA analog or digital. Embodiments of the system and method for providing a low-cost float-based sensor may be used for calibrated systems as well as low-cost small signal electronic systems. Float and barrier materials, of various densities, buoyancies, and weights may be carefully chosen for various types of fluids, if needed.

To enhance the contrast between the reflectivity of the target 122 and the sidewalls 130, polarizers (not shown) or other materials may be administered. In an embodiment, a dark, non-reflective barrier 130 and white Styrofoam target 122 may be employed, where the light diffusing properties of the target, such as Styrofoam, assures that a reduced amount of light returns to the sensor as the target moves away from the sensor. In another embodiment, a tangentially partially-reflective tube barrier 130 may be employed with a photo-absorbing target 122.

To prevent radial movement of the target that may result in false level variations, the target may be employed to slide along or surrounding one or more guide-wires. Electronics may be employed to allow for maximum and minimum limits to be electronically programmed, as well as sensor curve correction to compensate for non-linear light reflection.

The light source 162 may be an infra-red (IR) type, or other light frequency type, and is preferably LED, although other light types such as incandescent or fluorescent may be alternatively employed. One skilled in the art will therefore appreciate that other types of light sources may alternatively be used. The light sensor 166 may be an IR photo-transistor type, photo-diode, or any of a number of types, dependent on the light source employed, including CdS if visible light is employed.

One skilled in the art will therefore appreciate that other types of sensors may alternatively be used in coordination with the type of source employed. In an embodiment, the optical target 122 and surrounding reflective material only need to contrast at the wavelength of the photosensor of sensor 166. Various differences in orientation or other changes that cause differences in reflected light or energy intensity between the float and barrier may be used to differentiate between the float and the barrier materials and achieve a measurement of fluid level. In other embodiments, angles and/or amount of light reflection rather than the material make-up of the barrier walls and the target are used to measure levels. Many variations of the level sensor 150 would be understood by a person of ordinary skill in the art reading these descriptions.

Figure 2:
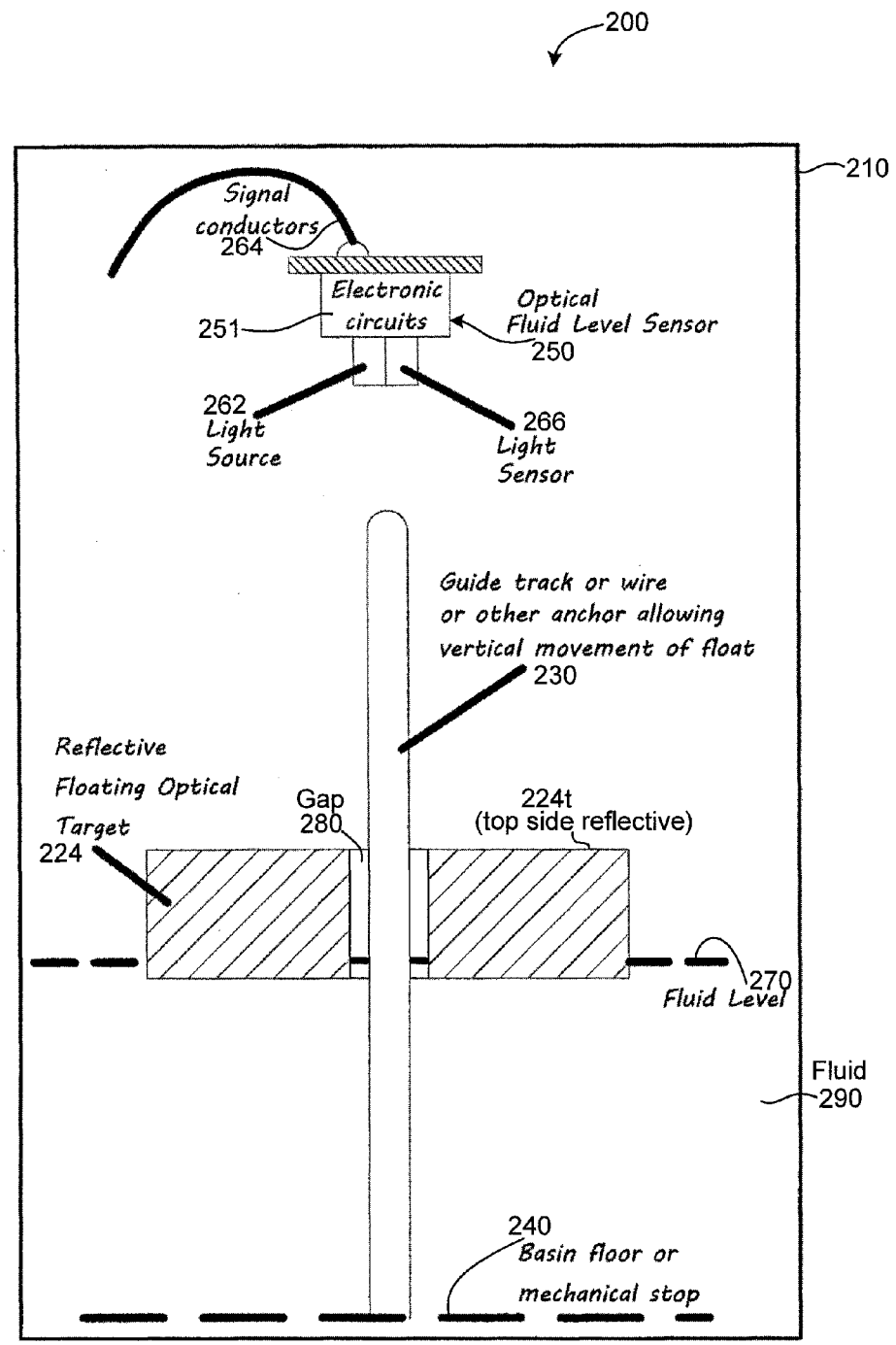
FIG. 2 is a cross-sectional side view illustrating an embodiment of a system for providing an optical float-based sensor.

In some embodiments, the barrier tube is not used. With reference to FIG. 2, shown is a cross-sectional side view illustrating an embodiment of a system 200 for providing an optical float-based sensor 250 within a tank 210 containing a fluid 290 to be measured. Because the float (which also functions as the target) 224 remains at or near the top of the fluid 290 and the light source 262 remains above the float/target 224, in certain installations it may be possible to remove the barrier tube (from FIG. 1) and simply use an air barrier or optically clear window above the fluid 290 and float/target 224 to adequately protect and isolate any electronic circuits 251 (and connected signal conductors 264) from the fluid 290 while allowing light from the light source 262 to bounce off of the float/target 224 (via reflective top side 224*t*) and strike the light sensor 266. In this application, a guide-wire/rod or track 230 to keep the float/target 224 moving freely (but constrained within a predetermined vertical path) within the optical path of the light sensor 266 may preferably be used. In one embodiment, a gap 280 is provided between the float/target 224 and guide-wire/rod 230. The light sensor 266 of level sensor 250 is used to determine the location of the float/target 224 which is indicative of the fluid level 270 of the fluid 290 to be measured. Limiter(s) or stop(s) 240 (such as a basin floor or mechanical stop) may be used to prevent the float/target 224 from moving too low vertically, and may be used to support the guide-wire/rod or track 230. When using a combined float and target, a light reflective material may be used on the upper portion or top of the float/target to assist in obtaining measurements.

Figure 3:
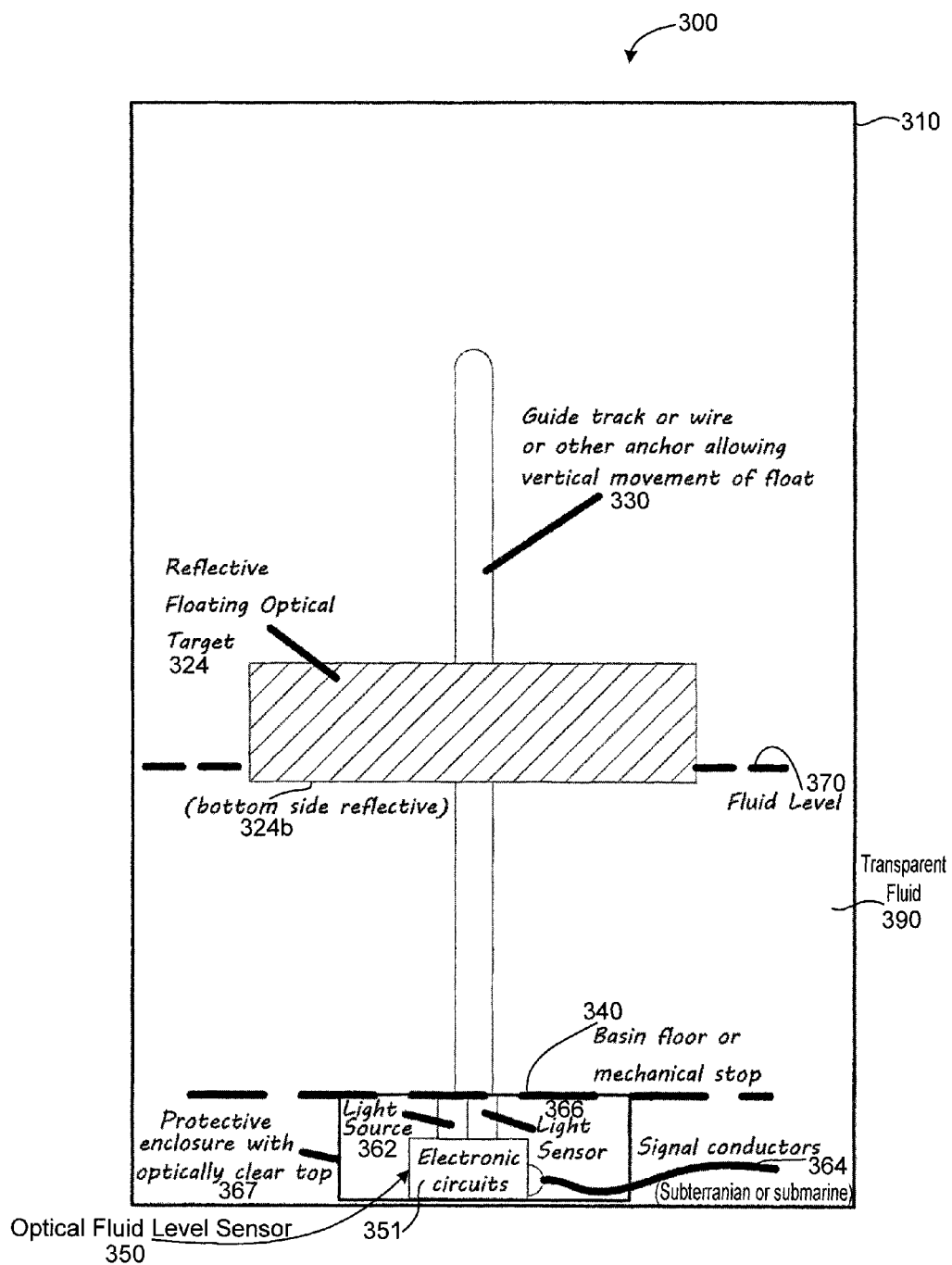
FIG. 3 is a side view illustrating another embodiment of a system for providing an optical float-based sensor.

With reference to FIG. 3, shown is a side view illustrating another embodiment of a system 300 for providing an optical float-based sensor 350 within a tank 310 containing a fluid 390 to be measured. FIG. 3 is similar to FIG. 2 in that a barrier tube is not used. Because the float (which also functions as the target) 324 remains at or near the top of the fluid 390 and the light source 362 remains below the float/target 324 and within or below the fluid 390, use of an air barrier or optically clear window such as a protective enclosure 367 is preferably used. The protective enclosure 367 is provided below or within the fluid 390 to adequately protect and isolate any electronic circuits 351 (and connected signal conductors 364) from the fluid 390 while allowing light from the light source 362 to bounce off of the float/target 324 (via reflective bottom side 324*b*) and strike the light sensor 366. The protective enclosure 367 contains the level sensor 350 including the light source 362, light sensor 366, and any electronic circuits 351. The protective enclosure 367 could contain these elements subterraniously within the tank structure, or submarinely. In this application, a guide-wire/rod or track 330 to keep the float/target 324 moving freely (but constrained within a predetermined vertical path) within the optical path of the light sensor 366 may preferably be used. In one embodiment, a gap 380 (not shown due to being a general non-cross-sectional side view, but may be of the type of gap 280 shown in FIG. 2) is provided between the float/target 324 and guide-wire/rod 330. The light sensor 366 of level sensor 350 is used to determine the location of the float/target 324 which is indicative of the fluid level 370 of the fluid 390 to be measured. Limiter(s) or stop(s) 340 (such as a basin floor or mechanical stop) may be used to prevent the float/target 324 from moving too low vertically, and may be used to support the guide-wire/rod or track 330. In this embodiment, preferably the fluid 390 is transparent to the wavelengths of light from the light source 362 detected by the light sensor 366.

The electronics may modulate the light to defend against component fatigue and other phenomena or to improve signal amplification and filtering, or it may use continuous or constant illumination. The modulation may be manually performed or automatically performed based on input from the light sensor 166 or other sensor.

With a magnetically coupled float and target and an optical sensor, many different types of target devices and formats may be employed, including the use of dark-graduated films, variable width slots, and spiral disks, all to modulate the light hitting the sensor either reflectively or transmissively according to the position of the float.

In addition to modulating the light source for the electronics to more easily isolate and amplify the reflected light signal for the purpose of determining fluid level, signal filtering after the light sensor can be employed to remove interference caused by ambient lighting in the cases where an optical barrier is not used. The filters could be used to reduce or eliminate 60 Hz or 120 Hz and their harmonics generated by artificial ambient lighting which may interfere with the light signal received by the sensor. Also, transparent optical color filters may also be employed to limit the reflected wavelengths to reduce interference caused by ambient light sources, especially in the case where light barriers are not used.

The electronics may also convert the signal for 4-20 mA systems, digital systems that employ RS-232, RS-485, ethernet, or any of a number of standards. This is done easily because of the typically small-signal nature of the electronic circuitry needed to source and sense the light. The measurements or results may be wirelessly communicated to a remote location for monitoring purposes.

Figure 4:
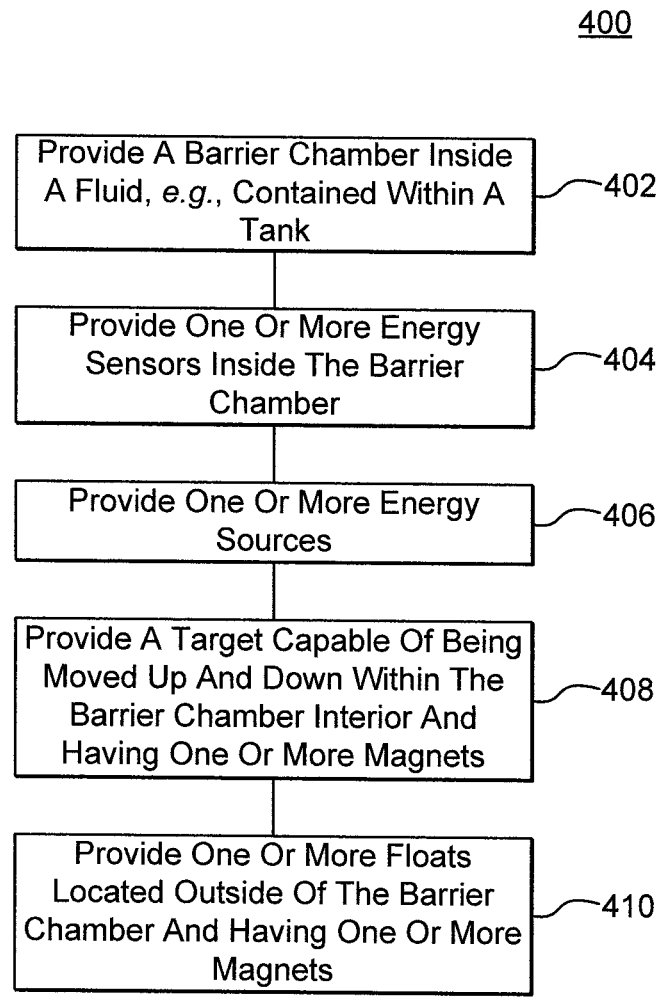
FIG. 4 is a flowchart illustrating an embodiment of a method for providing a float-based sensor of the type, for example, shown in FIG. 1.

FIG. 4 is a flowchart illustrating an embodiment of a method 400 for providing a float-based sensor. The method 400 provides a barrier chamber inside a fluid, e.g., contained within a tank (block 402), provides one or more energy sensors inside the barrier chamber (block 404). The method 400 further provides one or more energy sources (block 406) that may or may not be connected to the energy sensor, provides a target capable of being moved up and down within the barrier chamber interior and having one or more magnets (block 408), and provides one or more floats located outside of the barrier chamber and having one or more magnets (block 410). The barrier chamber interior is separated from the fluid in the tank by a barrier. The one or more floats are magnetically coupled to the target. Reflective properties of the barrier walls may contrast with reflective properties of the target. The sensor determines the fluid level in the tank by measuring variations in an amount of light striking the sensor when the target moves up and down within the barrier chamber interior. The target moves up and down based on the amount of fluid within the tank or body of fluid.

The blocks of method 400 illustrated in the flowchart of FIG. 4 may alternatively be arranged in a different order than shown. Also, steps in the process may be removed or only a portion of the steps may be performed at any given time.

In another embodiment (not shown), the barrier chamber 120 (including target 122 therewithin) of FIG. 1 may be located exterior to the tank 110 and may be magnetically coupled to a float within the tank (such as float 224 in FIG. 2). The float within the tank 110 and the target 122 within the exterior barrier chamber 120 may preferably each be guided via, for example, sliding along or surrounding one or more a guide track(s) or wire(s)/rod(s) so that each may freely move without hindrance. The equipment on the exterior of the tank 110 may be protected or covered by a device other than a barrier chamber 120 or may be left uncovered, open air.

Although the above embodiments describe the fluid level of the fluid to be measured as being contained within a tank, the fluid to be measured may be alternatively contained within other type containers, or with no container so as to measure the height of a body of water. As another alternative, embodiments may also be envisioned to employ the system/method in an environment (i.e. with or without a tank/container) that is initially without fluid such so as to be available for fluid measurement should water eventually be present. Embodiments where fluid may periodically be present may be contemplated as well.

In any of the above embodiments, the light source and light sensor could be made to float at the fluid level with a fixed target painted or otherwise set below or above the surface of the fluid.

In other embodiments, various other sensors (and corresponding sources) may be used such as audio, radio-frequency (RF), electro-magnetic, etc.

The contemplated modifications and variations specifically mentioned above and below are considered to be within the spirit and scope of the present invention.

Those of ordinary skill in the art will recognize that various modifications and variations may be made to the embodiments described above without departing from the spirit and scope of the present invention. It is therefore to be understood that the present invention is not limited to the particular embodiments disclosed above, but it is intended to cover such modifications and variations as defined by the following claims.

What is claimed is:

1. A system for providing a float-based sensor to measure a fluid level, comprising:
    a barrier chamber having an interior portion, the barrier chamber comprising:
        a barrier that defines the interior portion;
        a sensor;
        one or more energy sources; and
        a target located within the interior portion and capable of movement within the interior portion; and
    one or more floats located exteriorly to the barrier and having one or more magnets;
    wherein the one or more floats are magnetically coupled to the target via the one or more magnets, and wherein the sensor determines a location of the target by measuring an intensity of energy detected by the sensor.

2. The system of claim 1, wherein the interior portion is sealed via the barrier.

3. The system of claim 1, wherein the target is spherical in shape.

4. The system of claim 1, wherein at least one signal conductor is connected to the sensor and electronically delivers, amplifies, and/or converts variations in the amount of energy detected by the sensor.

5. The system of claim 4, wherein the at least one signal conductor is connected to the sensor via electronic circuitry contained within the interior portion.

6. The system of claim 1, wherein the sensor is an optical sensor and each of the one or more energy sources is a light source.

7. The system of claim 1, wherein the sensor is an audio sensor and each of the one or more energy sources is an audio source.

8. The system of claim 1, wherein the sensor is a radio frequency (RF) sensor and each of the one or more energy sources is an RF source.

9. The system of claim 1, wherein the barrier chamber, one or more floats, and a fluid level to be measured are contained within a tank.

10. The system of claim 1, wherein the target is a reflective or photo-absorbing optical target.

11. The system of claim 1, wherein an interior surface of the barrier has reflective properties which contrast with reflective properties of the target and wherein the target has greater reflective properties than the interior surface of the barrier.

12. The system of claim 1, wherein the target is capable of movement vertically within the interior portion.

13. A method for supplying a float-based sensor to measure a fluid level, comprising:
    providing a barrier chamber comprising a barrier defining an interior portion;
    providing a sensor;
    providing one or more energy sources;
    providing a target within the interior portion and capable of being moved within the interior portion; and
    providing one or more floats located exteriorly to the barrier and having one or more magnets;
    wherein the one or more floats are magnetically coupled to the target via the one or more magnets, and wherein the sensor determines a location of the target by measuring an intensity of energy detected by the sensor.

14. The method of claim 13, wherein the interior portion is sealed via the barrier.

15. The method of claim 13, wherein the target is spherical in shape.

16. The method of claim 13 further comprising connecting at least one signal conductor to the sensor, wherein the at least one signal conductor electronically delivers, amplifies, and/or converts variations in the amount of energy detected by the sensor.

17. The method of claim 16 further comprising providing electronic circuitry within the interior portion to connect the at least one signal conductor to the sensor.

18. The method of claim 13, wherein the sensor is an optical sensor and each of the one or more energy sources is a light source.

19. The method of claim 13, wherein the sensor is an audio sensor and each of the one or more energy sources is an audio source.

20. The method of claim 13, wherein the sensor is a radio frequency (RF) sensor and each of the one or more energy sources is an RF source.

21. The method of claim 13 further comprising providing a tank containing the barrier chamber, one or more floats, and a fluid level to be measured.

22. The method of claim 13, wherein the target is a reflective or photo-absorbing optical target.

23. The method of claim 13, wherein an interior surface of the barrier has reflective properties which contrast with reflective properties of the target and wherein the target has greater reflective properties than the interior surface of the barrier.

24. The method of claim 13, wherein the target is capable of moving vertically within the interior portion.

25. A system for providing a float-based sensor to measure a fluid level, comprising:
    a sensor;
    an energy source;
    a guide element; and
    a target capable of floating on a fluid while being guided by the guide element and reflecting energy from the energy source;
    wherein the sensor determines a location of the target by measuring an intensity of energy originating from the energy source, reflected by the target, and detected by the sensor.

26. The system of claim 25, wherein the sensor is of a type selected from the group consisting of an optical sensor, an audio sensor, a radio frequency (RF) sensor, an electromagnetic sensor, and combinations thereof.

27. The system of claim 25, wherein the target is capable of movement only in one dimension.

28. The system of claim 25, wherein the sensor and energy source are located below the target.

29. The system of claim 28 further comprising an enclosure, wherein the sensor and energy source are contained within the enclosure such that the sensor and energy source are spaced from a fluid corresponding to the fluid level.

* * * * *